(12) United States Patent
Guo

(10) Patent No.: US 11,981,235 B2
(45) Date of Patent: May 14, 2024

(54) CHILD SAFETY SEAT

(71) Applicant: WONDERLAND SWITZERLAND AG, Steinhausen (CH)

(72) Inventor: Zhengwen Guo, Dongguan (CN)

(73) Assignee: WONDERLAND SWITZERLAND AG, Steinhausen (CH)

( * ) Notice: Subject to any disclaimer, the term of this patent is extended or adjusted under 35 U.S.C. 154(b) by 0 days.

(21) Appl. No.: 17/705,014

(22) Filed: Mar. 25, 2022

(65) Prior Publication Data

US 2022/0305968 A1 Sep. 29, 2022

(30) Foreign Application Priority Data

Mar. 26, 2021 (CN) .......................... 202110324519.5

(51) Int. Cl.
*B60N 2/28* (2006.01)

(52) U.S. Cl.
CPC .......... *B60N 2/2893* (2013.01); *B60N 2/2887* (2013.01)

(58) Field of Classification Search
CPC .. B60N 2/2824; B60N 2/2827; B60N 2/2887; B60N 2/2893; B60N 2/289
See application file for complete search history.

(56) References Cited

U.S. PATENT DOCUMENTS

| 6,325,454 B1 | 12/2001 | Maier |
| 6,799,799 B2 | 10/2004 | Maier et al. |
| 7,044,549 B2 | 5/2006 | Maier et al. |
| 9,452,695 B2 | 9/2016 | Sedlack |
| 9,873,359 B2 | 1/2018 | Williams et al. |
| 9,975,457 B2 | 5/2018 | Chen et al. |
| 10,150,390 B2 * | 12/2018 | Sedlack ............... B60N 2/2821 |
| 10,322,651 B2 | 6/2019 | Hutchinson et al. |
| 10,569,673 B2 | 2/2020 | Anderson et al. |
| 2008/0277984 A1 | 11/2008 | Carine |
| 2013/0099535 A1 * | 4/2013 | Su .......................... B60N 2/286 297/250.1 |

FOREIGN PATENT DOCUMENTS

| CN | 101247972 A | 8/2008 |
| CN | 201587342 U * | 9/2010 |
| CN | 201685729 U * | 12/2010 |
| CN | 104169125 A | 11/2014 |
| CN | 204978315 U | 1/2016 |
| CN | 103057444 B | 2/2016 |
| CN | 103465805 B | 2/2016 |
| CN | 104169125 B | 8/2017 |
| CN | 108528290 A | 9/2018 |
| CN | 109849746 A | 6/2019 |

(Continued)

OTHER PUBLICATIONS

Office Action dated Jun. 2, 2023 from corresponding application No. TW 11220535440.

(Continued)

*Primary Examiner* — Milton Nelson, Jr.
(74) *Attorney, Agent, or Firm* — HAUPTMAN HAM, LLP

(57) ABSTRACT

A child safety seat includes: a base; a connector pivotally connected to the base via a pivot shaft and configured to be connected to a locking interface associated with the vehicle seat; and a damper configured to maintain the connector in the initial pivotal position.

17 Claims, 9 Drawing Sheets

(56) References Cited

FOREIGN PATENT DOCUMENTS

| | | | |
|---|---|---|---|
| CN | 209336534 | | 9/2019 |
| CN | 107499196 | | 9/2020 |
| CN | 107867207 | B | 11/2020 |
| DE | 102008051693 | A1 | 4/2010 |
| EP | 2251225 | A1 * | 11/2010 ........... B60N 2/2845 |
| EP | 3300946 | A1 | 4/2018 |
| GB | 2503092 | B | 6/2019 |
| JP | H07205698 | A | 8/1995 |
| KR | 101982761 | B1 | 5/2019 |
| KR | 20190138354 | A | 12/2019 |
| TW | 201204580 | | 2/2012 |
| TW | 1624386 | | 5/2018 |
| TW | 1661954 | | 6/2019 |

OTHER PUBLICATIONS

German Office Action issued in corresponding German Application No. 102022107147.2, dated Jun. 19, 2023, pp. 1-8.
Chinese First Office Action issued in corresponding Chinese Patent Application No. 202110324519.5, dated Jan. 11, 2024, pp. 1-30.

* cited by examiner

CHILD SAFETY SEAT

CROSS-REFERENCE OF RELATED APPLICATION

This application claims the priority of a Chinese patent application 2021103245195, filed on Mar. 26, 2021, and entitled "CHILD SAFETY SEAT", the entire content of which is incorporated herein by reference.

TECHNICAL FIELD

The present disclosure relates to a child safety seat.

BACKGROUND

A child safety seat can be attached to a car seat for a child to sit on. The child safety seat is equipped with a child restraint device to restrain the child in the safety seat, which can greatly reduce the injury suffered by the child when the car suddenly decelerates.

The ISOFIX fixing unit is widely used in the automotive field because they enable fast, efficient, reliable and easy-to-operate mounting of the child safety seat on the car seat. The car is equipped with an ISOFIX interface at the factory, and the child safety seat is equipped with an ISOFIX connector. The ISOFIX connector can be easily fixed to the ISOFIX interface of the car to form an ISOFIX fixing unit.

Currently, a base of the child safety seat is usually configured with two ISOFIX connectors, and the two ISOFIX connectors can be slidably connected to the base along a front-rear direction of the child safety seat, so as to be able to switch to a retracted state or an extended state. When the two ISOFIX connectors are in the extended state, they can be removably connected to the two standard ISOFIX interfaces on the bottom of the backrest of a vehicle seat, respectively.

When the vehicle decelerates suddenly, the child safety seat tends to rotate around the snap joint of the ISOFIX connector and the ISOFIX, and the child will sink and tip forward along with the child safety seat at first. After tipping to a certain extent, the child safety seat is pulled by the seat belt of the vehicle, and the child's head is easily detached from the top of the backrest of the child safety seat under the action of inertial force, and a severe collision with the front seat could occur, which will injure the child.

SUMMARY

According to some embodiments, a child safety seat is provided. The child safety seat includes: a base; a connector pivotally connected to the base via a pivot shaft, and the connector being configured to be connected to a locking interface associated with a vehicle seat; and a damper configured to maintain the connector in an initial pivotal position.

In one of the embodiments, the child safety seat further includes a limiting member disposed below the connector, wherein the limiting member is configured to limit rotation of the connector in a downward direction from the initial pivotal position.

In one of the embodiments, the connector is connected to the pivot shaft via a hanging member.

In one of the embodiments, the damper includes a torsion spring mounted between the pivot shaft and the base.

In one of the embodiments, the connector includes a first connector and a second connector spaced apart from each other along a left-right direction of the child safety seat, the pivot shaft includes a first pivot shaft and a second pivot shaft, a mounting end of the first connector is sleeved on the first pivot shaft and is capable of rotating with the first pivot shaft, and a mounting end of the second connector is sleeved on the second pivot shaft and is capable of rotating with the second pivot shaft.

In one of the embodiments, opposite ends of the first pivot shaft and the second pivot shaft are attached together, or the first pivot shaft and the second pivot shaft are integrally formed.

In one of the embodiments, the base is provided with a first adjustment hole slidably cooperated with the first pivot shaft, and a second adjustment hole slidably cooperated with the second pivot shaft; the base includes: a first connecting member, a first end of the first connecting member being connected to the first pivot shaft, and a second end of the first connecting member being connected to a first sliding rod; a second connecting member, a first end of the second connecting member being connected to the second pivot shaft, and a second end of second connecting member being connected to the second sliding rod, wherein extending directions of the first adjustment hole and the second adjustment hole are parallel to axial sliding directions of the first sliding rod and the second sliding rod, respectively; and a locking mechanism configured to lock axial sliding positions of the first sliding rod and the second sliding rod; wherein the torsion spring includes a first torsion spring mounted between the first pivot shaft and the first connecting member, and a second torsion spring mounted between the second pivot shaft and the second connecting member.

In one of the embodiments, the damper includes a spring, a first end of the spring is connected to the hanging member, and a second end of the spring is connected to a connecting point of the base.

In one of the embodiments, the hanging member includes: a first hanging lug, a first end of the first hanging lug being connected to the corresponding pivot shaft; and a first beam connected to a second end of the first hanging lug, and an extending direction of the first beam being parallel to an axis of the pivot shaft, wherein the connector is mounted on the first beam.

In one of the embodiments, the first end of the spring is connected to the first hanging lug of the corresponding hanging member, or the first end of the spring is connected to the first beam.

In one of the embodiments, the connector includes a first connector and a second connector, the pivot shaft includes a first pivot shaft and a second pivot shaft, the first connector and the second connector are connected to the first pivot shaft and the second pivot shaft respectively via the same hanging member, the same hanging member includes: a second beam, an extending direction of the second beam being parallel to the axes of the first pivot shaft and the second pivot shaft, and the first connector and the second connector being mounted to the second beam, respectively; and a second hanging lug and a third hanging lug, first ends of the second hanging lug and the third hanging lug being connected to the first pivot shaft and the second pivot shaft, respectively, and second ends of the second hanging lug and the third hanging lug being connected to the second beam, respectively.

In one of the embodiments, the first connector and the second connector are mounted at ends of the second beam, respectively, the first connector, the second hanging lug, the third hanging lug, and the second connector are spaced apart from each other on the second beam.

In one of the embodiments, the spring includes a first spring and a second spring, first ends of the first spring and the second spring are connected to the second hanging lug and the third hanging lug, respectively.

In one of the embodiments, a first end of the spring is connected to the second beam.

In one of the embodiments, the base is provided with a first adjustment hole slidably cooperated with the first pivot shaft, and a second adjustment hole slidably cooperated with the second pivot shaft; the base includes: a first connecting member, a first end of the first connecting member being connected to the first pivot shaft, and a second end of the first connecting member being connected to a first sliding rod; a second connecting member, a first end of the second connecting member being connected to the second pivot shaft, and a second end of the second connecting member being connected to the second sliding rod, wherein extending directions of the first adjustment hole and the second adjustment hole are parallel to axial sliding directions of the first sliding rod and the second sliding rod, respectively; and a locking mechanism configured to lock axial sliding positions of the first sliding rod and the second sliding rod.

In one of the embodiments, the connecting points are provided on the first connecting member and the second connecting member.

In one of the embodiments, the first connecting member and the second connecting member are connected via a transverse connecting beam, and the connecting point is provided on the transverse connecting beam.

In one of the embodiments, the base is provided with an adjustment hole slidably cooperated with the pivot shaft, the base includes: a connecting member, a first end of the connecting member being connected to the pivot shaft, and a second end of the connecting member being connected to a sliding rod, an extending direction of the adjustment hole being parallel to an axial sliding direction of the sliding rod; and a locking mechanism configured to lock an axial sliding position of the sliding rod.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

To illustrate the technical solutions according to the embodiments of the present invention or in the prior art more clearly, the accompanying drawings for describing the embodiments or the prior art are introduced briefly in the following. Apparently, the accompanying drawings in the following description are only some embodiments of the present invention, and persons of ordinary skill in the art can derive other drawings from the accompanying drawings without creative efforts.

DETAILED DESCRIPTION OF THE EMBODIMENTS

Figure 1:
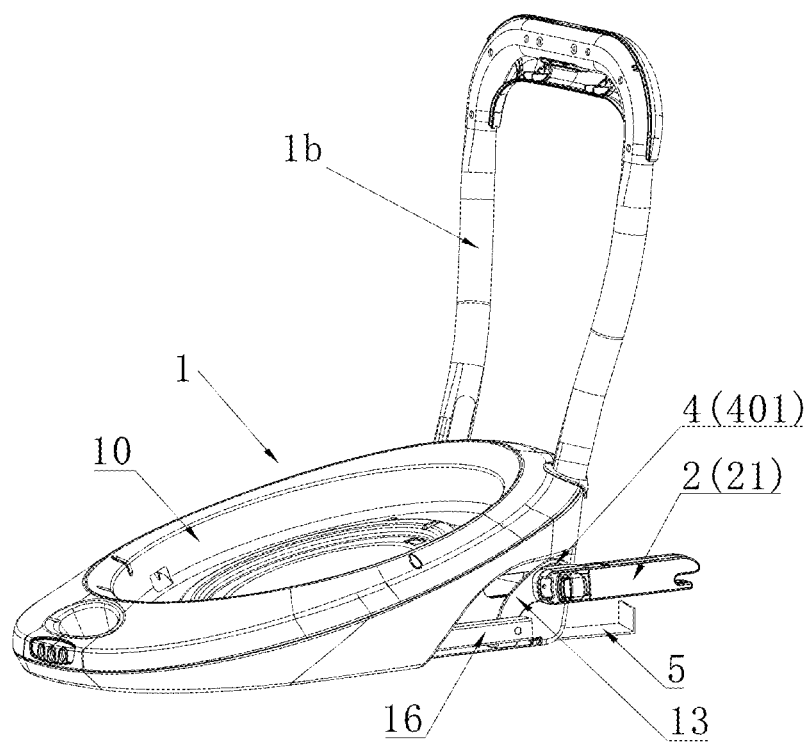
FIG. 1 is a perspective view of a base of a child safety seat according to an embodiment of the present disclosure.

Embodiments of the invention are described more fully hereinafter with reference to the accompanying drawings. The various embodiments of the invention may, however, be embodied in many different forms and should not be construed as limited to the embodiments set forth herein. Rather, these embodiments are provided so that this disclosure will be thorough and complete, and will fully convey the scope of the invention to those skilled in the art. Elements that are identified using the same or similar reference characters refer to the same or similar elements.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element is referred to as being "connected" or "coupled" to another element, it can be directly connected or coupled to the other element or intervening elements may be present. In contrast, if an element is referred to as being "directly connected" or "directly coupled" to another element, there are no intervening elements present.

It will be understood that, although the terms first, second, etc. may be used herein to describe various elements, these elements should not be limited by these terms. These terms are only used to distinguish one element from another. Thus, a first element could be termed a second element without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
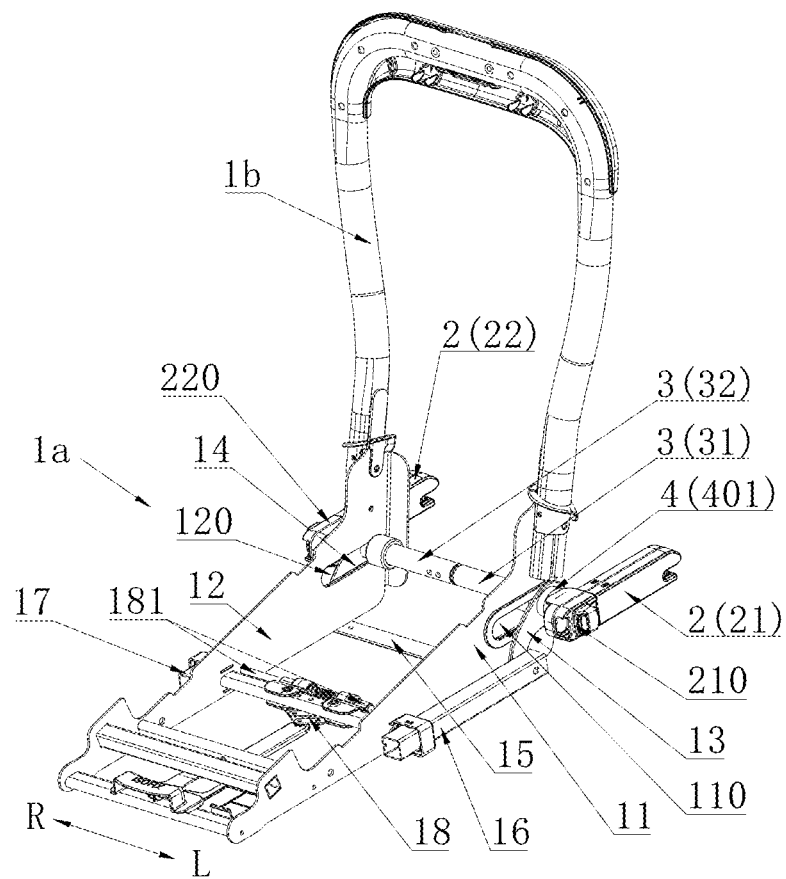
FIG. 2 is a perspective view of a frame and a top rod of the base of FIG. 1.

FIGS. 1 to 4 show a partial structure of a child safety seat according to a first embodiment of the present disclosure. The child safety seat includes a base 1 and a connector 2 mounted on the base 1. The connector 2 can be removably connected to a locking interface 80 of a vehicle seat 9, such that the child safety seat can be fastened to or removed from the vehicle seat 9. The connectors 2 include a first connector 21 and a second connector 22, and the two connectors 2 may be spaced apart from each other along the left-right direction of the child safety seat. Referring to FIG. 2, a direction indicated by arrow L is left, and a direction indicated by arrow R is right. Each connector 2 may be, for example but not limited to, an ISOFIX connector. The vehicle seat 9 includes a cushion portion 91 and a backrest portion 92. Two locking interfaces 80 are provided at a bottom of the backrest portion 92, and each locking interface 80 may be, for example but not limited to, an ISOFIX interface.

The base 1 is configured to be placed on the cushion portion 91. Referring to FIGS. 1 and 2, the base 1 may include a support portion 10 made of, for example, a plastic material, and a base frame 1a connected to the support portion 10. A body of the child safety seat can be mounted above the support portion 10, and a top rod 1b can be mounted on the base frame 1a. The top rod 1b is usually formed by a U-shaped tube, and is configured to abut against the backrest portion 92 to prevent the child safety seat from overturning.

Each connector 2 is pivotally connected to the base frame 1a of the base 1 via a pivot shaft 3, so as to allow the connector 2 to rotate around an axis of the pivot shaft 3 when the child safety seat is mounted on the vehicle seat 9 and is in a normal use state. The pivot shaft 3 may include a first pivot shaft 31 and a second pivot shaft 32. When the child safety seat is in a normal use state, an axis of the first pivot shaft 31 and an axis of the second pivot shaft 32 substantially coincide. A mounting end 210 of the first connector 21 is sleeved on the first pivot shaft 31 and can rotate together with the first pivot shaft 31. A mounting end 220 of the second connector 22 is sleeved on the second pivot shaft 32 and can rotate along with the second pivot shaft 32. Although in this embodiment, each connector 2 is directly sleeved on the corresponding pivot shaft 3, in other embodiments, a hanging member 6 (see FIG. 5) may be sleeved on each pivot shaft 3, and each connector 2 is mounted on the corresponding hanging member 6. In other words, each connector 2 is indirectly connected to the corresponding pivot shaft 3 via the hanging member 6, so as to be able to rotate around the axis of the pivot shaft 3 and then pivotally connected to the base 1.

The child safety seat further includes a damper 4. The damper 4 is configured to maintain each connector 2 in an initial pivotal position. The initial pivotal position is a position of the connector 3 when the child safety seat is normally mounted on the vehicle seat 9. In some embodiments, the damper 4 may include a torsion spring mounted between the pivot shaft 3 and the base 1. One end of the torsion spring may be connected to the pivot shaft 3, and the other end thereof may be connected to the base 1. Of course, there are many implementations of the damper 4, which are not limited to the examples described in the present specification.

The states change of the child safety seat will be described below with reference to FIG. 3 and FIG. 4, when the mounted vehicle suddenly decelerates, the child safety seat can provide protection for the child.

Figure 3:
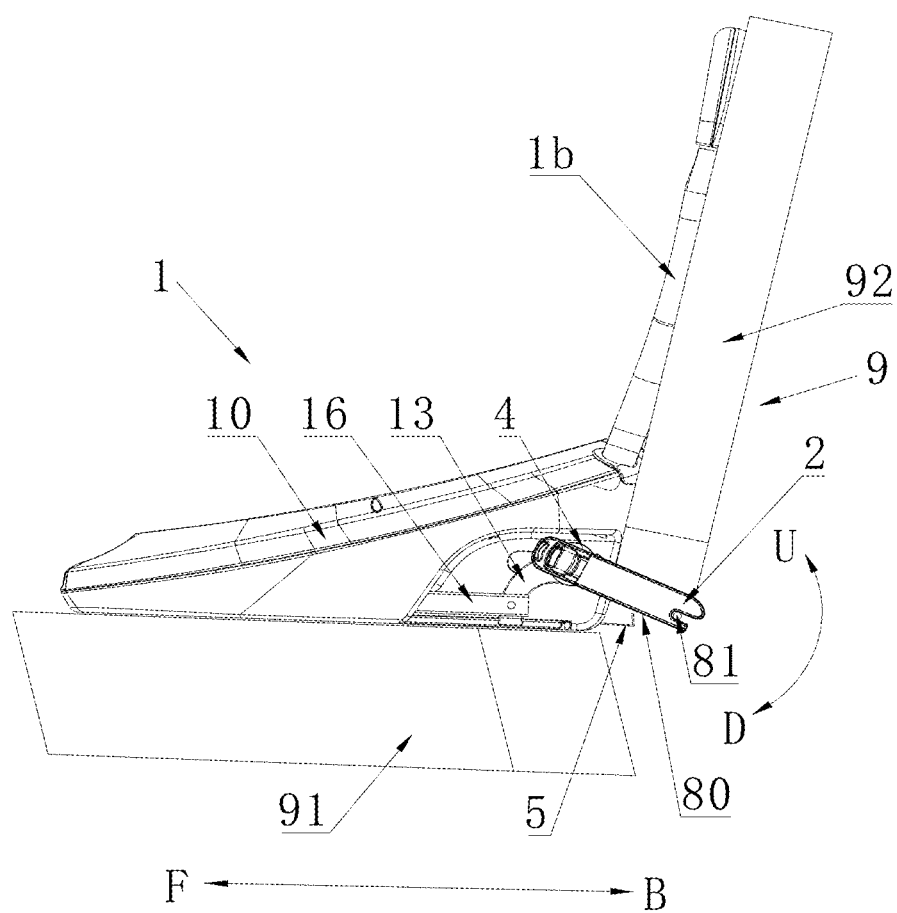
FIG. 3 is a side view of the base of FIG. 1, wherein a connector of the child safety seat is in an initial pivotal position.

FIG. 3 shows a side view of the child safety seat mounted on the vehicle seat 9 and in a normal mounting state. Each connector 2 is latched in the corresponding locking interface 80, and a snap joint 81 is formed at each snapping position, and each connector 2 is in its initial pivotal position. In FIG. 3, a direction of arrow F indicates the forward direction of the child safety seat, and a direction of arrow B indicates the rearward direction of the child safety seat.

Figure 4:
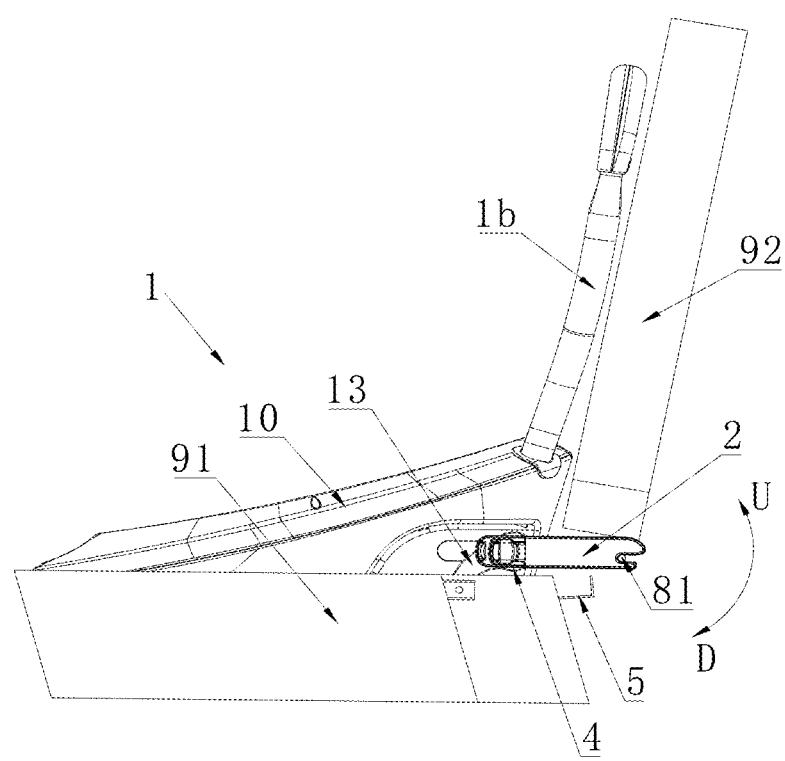
FIG. 4 is a side view showing relative positions of the base of FIG. 1 and the vehicle seat when an accident occurs in the vehicle.

Referring to FIG. 4, during normal driving, when the vehicle suddenly decelerates due to an accident (such as emergency braking), the child safety seat as a whole will lean forward relative to the seat cushion portion 91 and tend to flip forward around the snap joint 81 along a direction indicated by an arrow U. In the conventional child safety seat, the connector 2 and the base 1 are connected in a non-pivoting manner, during the rotation of the connector 2 and the base 1 around the snap joint 81, a front end of the seat cushion of the child safety seat will lean much deeper than a rear end of the seat cushion, which will cause the child to flip forward as a whole, and the child's head is likely to move forward and may collide with the front seat. In this embodiment, since the connector 2 and the base 1 are pivotally connected via the pivot shaft 3, the child safety seat can lean in a relatively balanced manner and can move forward slightly. On the one hand, the impact force on the child safety seat can be buffered, on the other hand, the movement tendency of the child caused by the child safety seat to flip forward is alleviated, thereby providing better protection for the child. After the vehicle works normally, the child safety seat and the connector 2 return to the normal state shown in FIG. 3 under the action of resilience of the seat cushion portion 91 and the damper 4, and the connector 2 rotates along the direction of arrow D shown in FIG. 4 and returns to the initial pivot position, such that the child safety seat can still ensure the safety of the child in the normal mounting state.

Referring to FIGS. 1, 3 and 4, the child safety seat may further include a limiting member 5 located below each connector 2. The limiting member 5 may be connected to the base 1, and the limiting member 5 may be configured to limit the initial pivotal position of each connector 2, such that the connection of the connector 2 with the vehicle seat 9 is more convenient.

Referring to FIG. 2 again, the base 1 may include a first side plate 11 and a second side plate 12 that are opposite to each other, and the first side plate 11 and the second side plate 12 may be fixed together by a plurality of transverse connecting beams 15. The first side plate 11 is provided with a first adjustment hole 110, the second side plate 12 is provided with a second adjustment hole 120. The first adjustment hole 110 and the second adjustment hole 120 extend substantially parallel to each other along a front-rear direction of the child safety seat. The base 1 may further include a first connecting member 13 and a second connecting member 14. A first end of the first connecting member 13 is connected to the pivot shaft 31, and the first pivot shaft 31 is slidably disposed in the first adjustment hole 110. A first end of the second connecting member 14 is connected to the second pivot shaft 32, and the second pivot shaft 32 is slidably disposed in the second adjustment hole 120. As such, by adjusting positions of the first pivot shaft 31 and the second picot shaft 32 in the first adjustment hole 110 and the second adjustment hole 120, each connector 2 has an extended state to be connected to the locking interface, or a retracted state to facilitate storage and transportation.

In order to limit the positions of each pivot shaft 31, 32 in the corresponding adjustment hole 110, 120, so as to adjust the protruding length of each connector 2, referring to FIG. 2, in some embodiments, the base 1 may further include a first sliding rod 16, a second sliding rod 17, and a locking structure 18. The first sliding rod 16 is slidably mounted on the first side plate 11 and is connected to the first connecting member 13. A sliding direction of the first sliding rod 16 is parallel to the extending direction of the first adjustment hole 110. The second sliding rod 17 is slidably mounted on the second side plate 12 and is connected to the second connecting member 14. A sliding direction of the second sliding rod 17 is parallel to the extending direction of the second adjustment hole 120. The first sliding rod 16 and the second sliding rod 17 are both provided with a plurality of positioning holes in the axial direction. The locking structure 18 includes two elastic deadbolts 181. The elastic deadbolts 181 are inserted into different positioning holes to lock sliding positions of the first sliding rod 16 and the second sliding rod 17, and the positions of each pivot shaft 3 in the corresponding adjustment hole can be restricted via the first connecting member 13 and the second connecting member 14.

A second end of the first connecting member 13 and a second end of the second connecting member 14 can be connected to the first sliding rod 16 and the second sliding rod 17, respectively. As such, the sliding of the first sliding rod 16 and the second sliding rod 17 can drive the two connectors 2 to move synchronously via the first pivot shaft 31 and the second pivot shaft 32. In addition, the transverse connecting beam 15 may be provided between the second end of the first connecting member 13 and the second end of the second connecting member 14, and the transverse connecting beam 15 can enhance the structural strength of connecting members 13, 14. In some embodiments, the first connector 13, the second connector 14, and the transverse connecting beam 15 may be integrally formed.

In order to adapt to the sliding connection relationship between each connector 2 and the corresponding adjustment hole, the damper 4 may correspondingly include a first torsion spring 401 and a second torsion spring (not shown). The first torsion spring 401 is mounted between the first pivot shaft 31 and the first connecting member 13, and a second torsion spring is mounted between the second pivot shaft 32 and the second connecting member 14. The first torsion spring 401 can be sleeved on the first pivot shaft 31, and both ends of the first torsion spring 401 can be connected to the first pivot shaft 31 and the first connecting member 13, respectively. Similarly, the second torsion spring 401 can be sleeved on the second pivot shaft 32, and both ends of the first torsion spring 401 can be connected to the second pivot shaft 32 and the second connecting member 14, respectively.

Referring to FIG. 2 again, the first side plate 11 and the second side plate 12 may be located between the two connectors 2. Ends of the first pivot shaft 31 and the second pivot shaft 32 opposite to each other may be attached together. In other embodiments, the first pivot shaft 31 and the second pivot shaft 32 may be integrally formed. In addition, in some embodiments, the outer surfaces of the first side plate 11 and the second side plate 12 away from each other are respectively provided with bosses (not labeled) that surround the respective adjustment holes. The first connecting member 13 and the second connecting member 14 are in contact with the corresponding bosses, respectively.

It should be noted that, although the base 1 in this embodiment includes the first side plate 11 and the second side plate 12 that are fixed together via a plurality of connecting beams, in other embodiments, the shape of the base 1 may also be various, for example, the first side plate 11 and the second side plate 12 may be integrally formed.

Referring to FIGS. 5 to 9, a partial structure of a child safety seat according to a second embodiment of the present disclosure is shown. The main difference between this embodiment and the aforementioned first embodiment lies in the connection manner between the connector 2 and the pivot shaft 3. In the second embodiment, the connector 2 is not directly mounted on the pivot shaft 3, but is connected to the pivot shaft 3 via the hanging member 6. The same structure of this embodiment as the aforementioned first embodiment will not be repeated hereafter.

Figure 5:
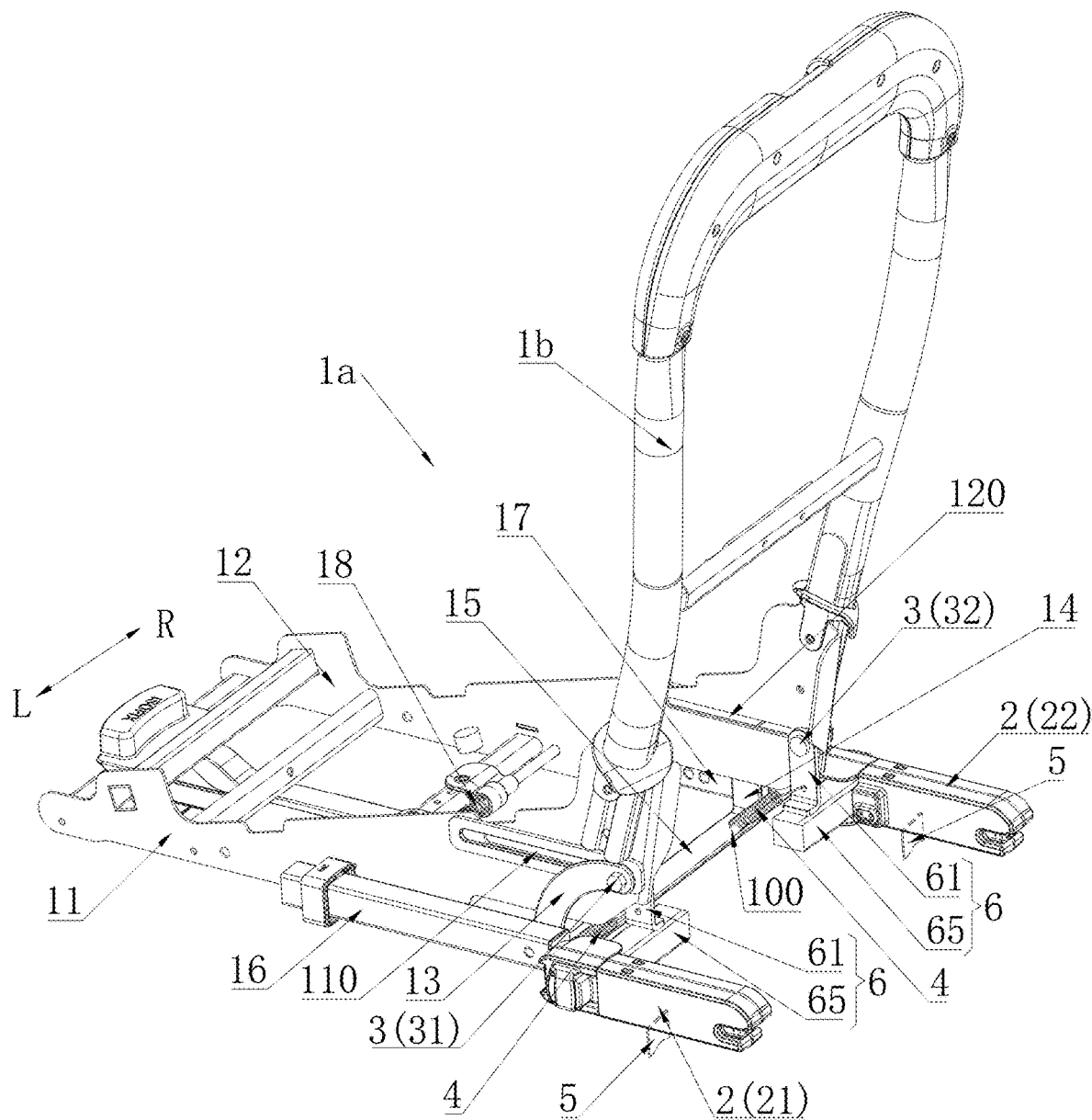
FIG. 5 is a perspective view of the frame and the top rod of the base according to another embodiment of the present disclosure.

Referring to FIG. 5, the two connectors 2 are connected to the pivot shaft 3 respectively via the two hanging members 6. As previously described, the two connectors 2 include a first connector 21 and a second connector 22, and the pivot shaft 3 includes a first pivot shaft 31 and a second pivot shaft 32. Each hanging frame 6 includes a first hanging lug 61 and a first beam 65. A first end of the first hanging lug 61 is connected to the corresponding pivot shaft 3, and a second end thereof is connected to the first beam 65. An extending direction of the first beam 65 is parallel to the axis of the pivot shaft 3 and is configured to mount the corresponding connector 2. As such, the connector 2 is indirectly connected to the pivot shaft 3 via the hanging member 6, so as to be pivotally connected to the base 1.

In FIG. 5, the damper 4 may include two springs, each spring can be configured to hold the associated connector 2 in the initial pivotal position. Specifically, a first end of each spring is connected to the first hanging lug 61 of the corresponding hanging member 6, or the first end of each spring is connected to the first beam 65. A second end of each spring is connected to a connecting point 100 of the base 1. Each pivot shaft 3 is adjustably disposed in the first adjustment hole 110 and the second adjustment hole 120, and each pivot shaft 3 is connected to the first connecting member 13 and the second connecting member 14, respectively. The first connecting member 13 and the second connecting member 14 are connected to the first sliding rod 16 and the second sliding rod 17, respectively. Therefore, each connecting point 100 can be provided on the transverse connecting beam 15, such that the damper 4 can translate accordingly following the position adjustment of the pivot shaft 3. Of course, the connecting point 100 may not be provided on the transverse connecting beam 15, for example, it may be provided on the first connecting member 13 and the second connecting member 14.

Figure 8:
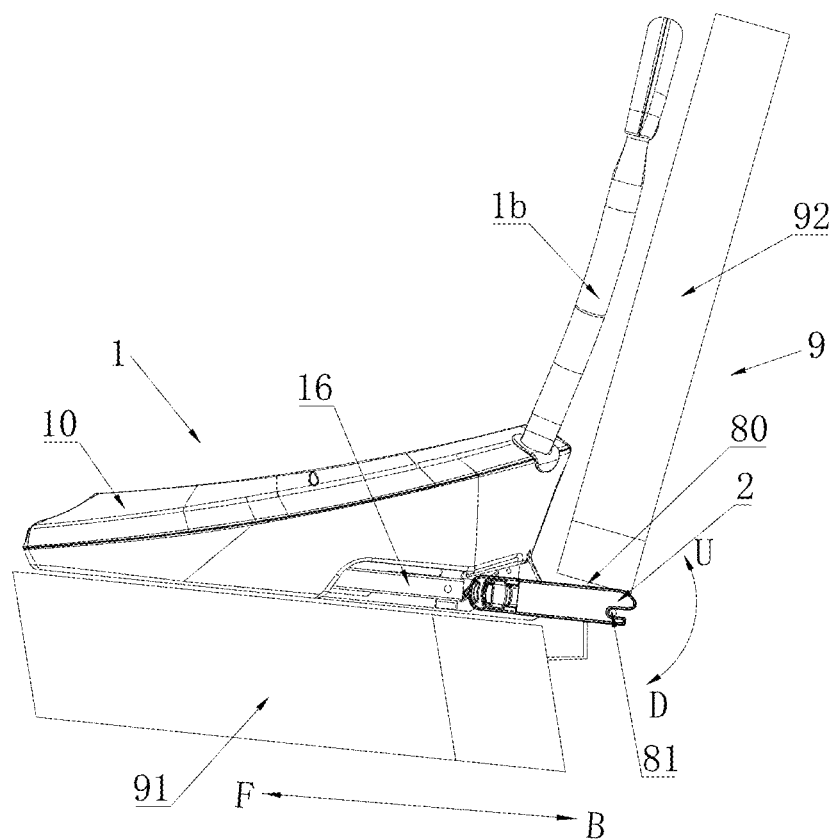
FIG. 8 is a side view of the base of FIGS. 5 and 6, wherein the connector of the child safety seat is in the initial pivotal position.
Figure 9:
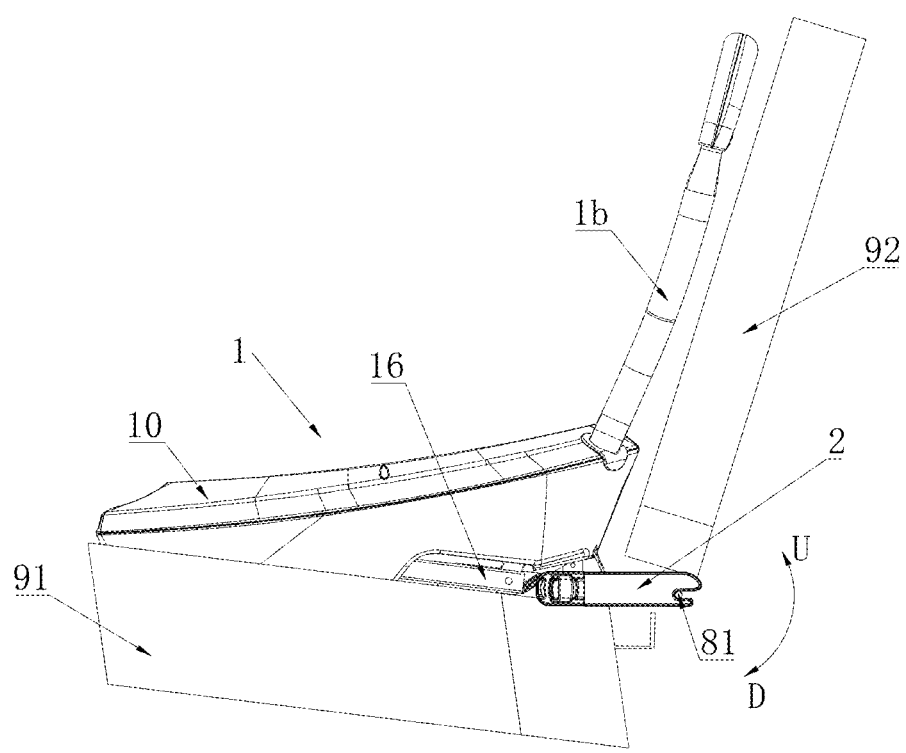
FIG. 9 is a side view showing relative positions of the base of FIGS. 5 and 6 when the vehicle is in an accident.

Referring to FIGS. 8 and 9, each connector 2 is connected to each pivot shaft 3 via the hanging member 6, respectively. The first hanging lug 61 and the corresponding connector 2 are substantially L-shaped structure when viewed from the side. When the vehicle is braked in an emergency, this L-shaped structure can not only enable the child safety seat to move downward in a relatively uniform manner, but also may pull the child safety seat toward the backrest 92 as a whole, which helps to increase the distance between the child and the front seat, thus achieving a better protection effect. Of course, in other embodiments, the first hanging lug 61 and the corresponding connector 2 are not limited to the aforementioned L-shape, and may also be in any other suitable shapes.

Referring to FIG. 5, in this embodiment, each connector 2 is connected to the first hanging lug 61 via a first beam 65, and the first beam 65 allows each connector 2 to be arranged on the outside of the first side plate 11 and the second side plate 12. As such, while ensuring that a distance between the two connectors 2 matches a distance between the two locking interfaces on the vehicle seat 9, a distance between the first side plate 11 and the second side plate 12 can be compressed, which allows the structure of the base frame 1a to be more compact.

Figure 6:
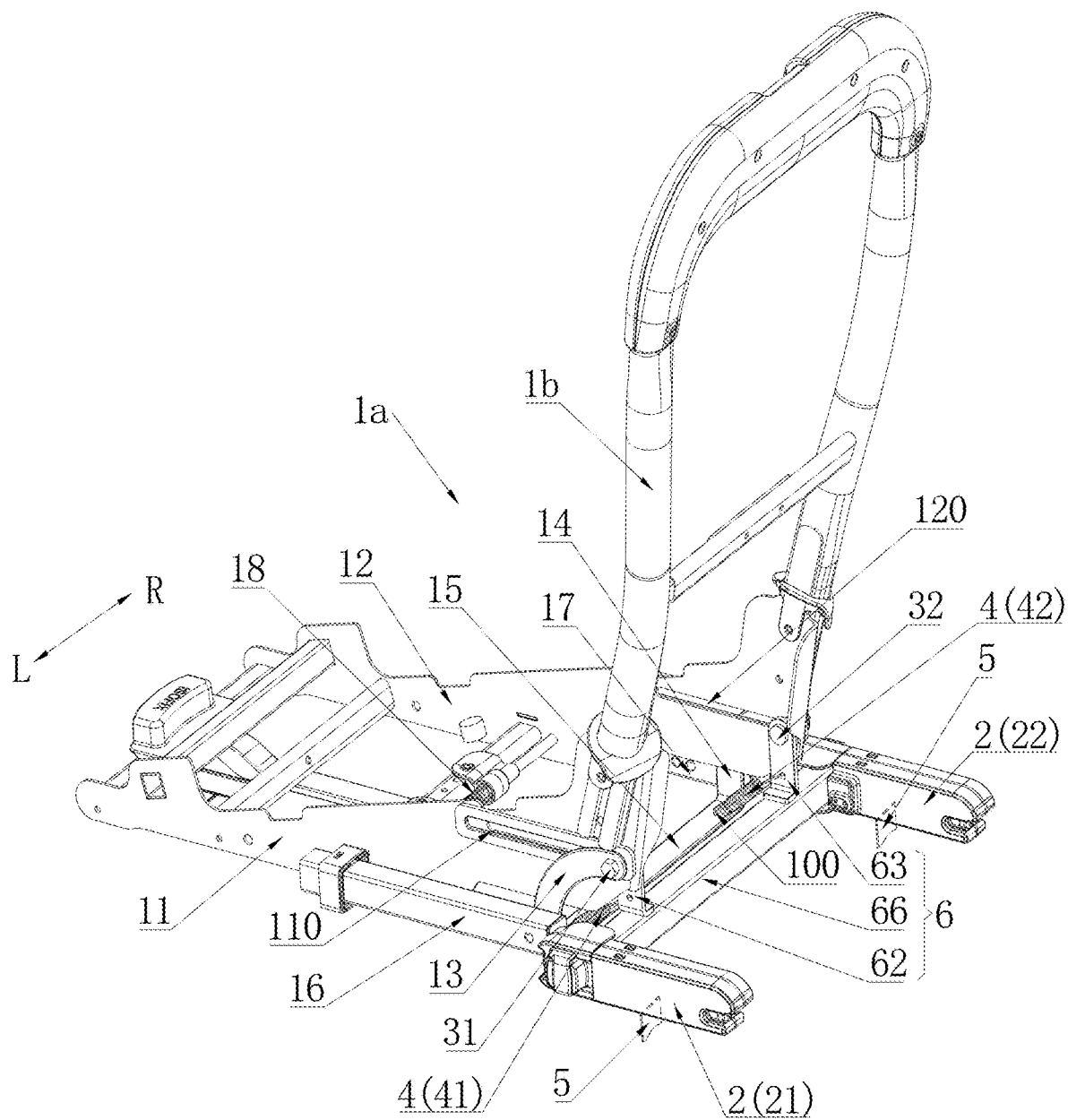
FIG. 6 is a perspective view of the frame and the top rod of the base according to yet another embodiment of the present disclosure in one direction.
Figure 7:
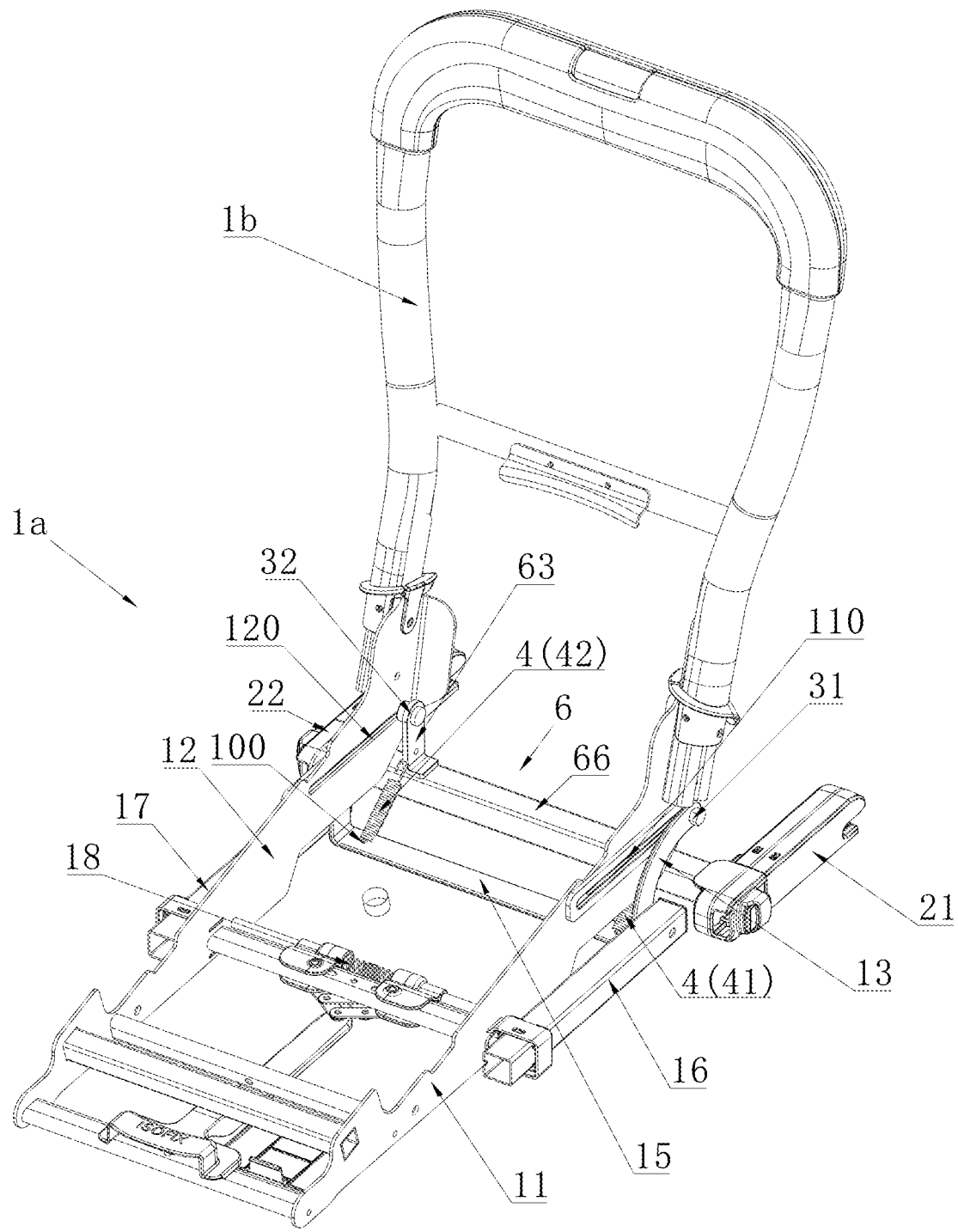
FIG. 7 is a perspective view of the frame and the top rod of the base of FIG. 6 in another direction.

Referring to FIGS. 6 and 7, the two connectors 2 are connected to the first pivot shaft 31 and the second pivot shaft 32 respectively via the same hanging member 6. The hanging member 6 includes a second beam 66, a second hanging lug 62, and a third hanging lug 63. An extending direction of the second beam 66 is substantially parallel to the axis of the pivot shaft 3, and the first connector 21 and the second connector 22 are mounted at end positions of the second beam 66, respectively. A first end of the second hanging lug 62 is connected to the first pivot shaft 31, and a second end thereof is connected to the second beam 66. A first end of the third hanging lug 63 is connected to the second pivot shaft 32, and a second end thereof is connected to the second beam 66. The first connector 21, the second hanging lug 62, the second hanging lug 63, and the second connector 22 are spaced apart from each other on the second beam 66. The hanging member 6 shown in FIGS. 6 and 7 not only has the effect of that of the hanging member 6 shown in FIG. 5, but also can make the actions of the two connectors 2 have better consistency.

Referring to FIG. 6, the damper 4 may include a first spring 41 and a second spring 42. A first end of the first spring 41 may be connected to the second hanging lug 62, and a second end thereof may be connected to a hinge point of the transverse connecting beam 15. A first end of the second spring 42 is connected to the third hanging lug 63, and a second end thereof is connected to another connecting point 100 of the transverse connecting beam 15.

In other embodiments, the damper 4 may include only one spring, a first end of the spring is connected to the second beam 66 and a second end thereof is connected to the connecting point 100 of the transverse connecting beam 15. For example, both ends of the spring are connected to the middle portion of the second beam 66 and the middle portion of the transverse connecting beam 15, respectively. In other embodiments, the damper 4 may include two or more springs, and these springs may be connected between the second beam 66 and the transverse connecting beam 15 with even spacing.

As previously described, the first pivot shaft 31 and the second pivot shaft 32 are slidably cooperated with the first adjustment hole 110 and the second adjustment hole 120, one end of the first connecting member 13 and the second connecting member 14 is connected to the corresponding pivot shaft 3, and the other end thereof is connected to the first sliding rod 16 and the second sliding rod 17, and the position of each pivot shaft 3 in the adjustment holes 110, 120 is locked by locking a sliding position of the sliding rods 16, 17 by the locking mechanism 18.

The state change of the child safety seat will be described below with reference to FIG. 8 and FIG. 9, when the mounted vehicle suddenly decelerates, the child safety seat can provide protection for the child.

FIG. 8 shows a side view of the child safety seat mounted on the vehicle seat and in a normal mounting state. Each connector 2 is latched in the corresponding locking interface 80, and a snap joint 81 is formed at each snapping position, and each connector 2 is in its initial pivotal position. In FIG. 8, a direction of arrow F indicates the forward direction of the child safety seat, and a direction of arrow B indicates the rearward direction of the child safety seat.

Referring to FIG. 9, during normal driving, when the vehicle suddenly decelerates due to an accident (such as emergency braking), the child safety seat as a whole will lean forward relative to the seat cushion portion 91 and tend to flip forward around the snap joint 81 along a direction indicated by an arrow U, shown in FIG. 9. The connector 2 and the base 1 are pivotally connected by the pivot shaft 3. The hanging member 6 and the connector 2 are L-shaped when viewed from the side. The child safety seat will lean in a relatively balanced manner and can move slightly backward. On the one hand, the impact force received by the child safety seat is buffered, and on the other hand, the movement tendency of the child safety seat to cause the child to flip forward is alleviated, thereby providing better protection for the child. After the vehicle works normally, the child safety seat and the connector 2 return to the normal state shown in FIG. 8 under the action of the resilience of the seat cushion portion 91 and the damper 4, and the connector 2 rotates along the direction of the arrow D shown in FIG. 9 and returns to the initial pivot position when returning. The child safety seat returns to the state shown in FIG. 8 under the resilience of the seat cushion portion 91, such that the child safety seat can still ensure the safety of the child in the normal mounting state. In other embodiments, the side-view shapes of the suspension member 6 and the connector 2 are not limited to the above-mentioned L-shape, and may also be any other suitable shape.

It should be noted that, although in the aforementioned embodiments, the child safety seat includes two connectors 2, in other embodiments, the child safety seat may include one or more than two connectors. According to the number of connectors 2, the number of pivot shafts 3 for pivotally connecting the connector 2 and the base 1 can be adjusted accordingly, and the number of the dampers 4 configured to keep the connector 2 in the initial pivot position can also be adjusted accordingly, and the number of adjustment holes, sliding rods and other components related to the position adjustment of the connectors 2 can also be adjusted accordingly.

The child safety seat provided by the embodiments of the present disclosure can be used not limited to the vehicles, and can also be used in aircraft, ships, or any other suitable fields.

The technical features of the embodiments described above may be arbitrarily combined. For the sake of brevity of description, not all possible combinations of the technical features in the aforementioned embodiments are described. However, as long as there is no contradiction between the combinations of these technical features, all should be considered as the scope of this specification.

The aforementioned examples only express several implementations of the present disclosure, and the descriptions thereof are more specific and detailed, but they cannot be understood as a limitation on the scope of the present disclosure. It should be noted that, for those who skilled in the art, a plurality of modifications and improvements can be made without departing from the concept of the present disclosure, which all belong to the protection scope of the present disclosure. Therefore, the protection scope of the present disclosure shall be subject to the appended claims.

What is claimed is:

1. A child safety seat, comprising:
   a base;
   a connector, the connector being configured to be connected to a locking interface of a vehicle seat;
   a pivot shaft pivotally connecting the connector and the base;
   a damper configured to maintain the connector in an initial pivotal position, and
   a limiting member disposed below the connector, wherein the limiting member is configured to limit rotation of the connector in a downward direction from the initial pivotal position,
   wherein when the connector is connected to the locking interface, the connector is configured to rotate around an axis of the pivot shaft, and the damper is configured to, upon the connector rotating relatively to the base, enable the connector to return to the initial pivotal position.

2. The child safety seat according to claim 1, wherein the base is provided with an adjustment hole slidably cooperated with the pivot shaft, the base comprising:

a connecting member, a first end of the connecting member being connected to the pivot shaft, and a second end of the connecting member being connected to a sliding rod, an extending direction of the adjustment hole being parallel to an axial sliding direction of the sliding rod; and a locking mechanism configured to lock an axial sliding position of the sliding rod.

3. The child safety seat according to claim 1, wherein the connector is connected to the pivot shaft via a hanging member.

4. A child safety seat, comprising:

a base;

a connector, the connector being configured to be connected to a locking interface of a vehicle seat;

a pivot shaft pivotally connecting the connector and the base; and a damper configured to maintain the connector in an initial pivotal position, wherein when the connector is connected to the locking interface, the connector is configured to rotate around an axis of the pivot shaft, the damper is configured to, upon the connector rotating relatively to the base, enable the connector to return to the initial pivotal position, and the damper comprises a torsion spring mounted between the pivot shaft and the base.

5. The child safety seat according to claim 4, wherein the connector comprises a first connector and a second connector spaced apart from each other along a left-right direction of the child safety seat, the pivot shaft comprises a first pivot shaft and a second pivot shaft, a mounting end of the first connector is sleeved on the first pivot shaft and is capable of rotating with the first pivot shaft, and a mounting end of the second connector is sleeved on the second pivot shaft and is capable of rotating with the second pivot shaft.

6. The child safety seat according to claim 5, wherein opposite ends of the first pivot shaft and the second pivot shaft are attached together, or the first pivot shaft and the second pivot shaft are integrally formed.

7. The child safety seat according to claim 5, wherein the base is provided with a first adjustment hole slidably cooperated with the first pivot shaft, and a second adjustment hole slidably cooperated with the second pivot shaft; the base comprising:

a first connecting member, a first end of the first connecting member being connected to the first pivot shaft, and a second end of the first connecting member being connected to a first sliding rod;

a second connecting member, a first end of second connecting member being connected to the second pivot shaft, and a second end of second connecting member being connected to the second sliding rod, wherein extending directions of the first adjustment hole and the second adjustment hole are parallel to axial sliding directions of the first sliding rod and the second sliding rod, respectively; and a locking mechanism configured to lock axial sliding positions of the first sliding rod and the second sliding rod;

wherein the torsion spring comprises a first torsion spring mounted between the first pivot shaft and the first connecting member, and a second torsion spring mounted between the second pivot shaft and the second connecting member.

8. A child safety seat, comprising:

a base;

a connector, the connector being configured to be connected to a locking interface of a vehicle seat;

a pivot shaft pivotally connecting the connector and the base; and a damper configured to maintain the connector in an initial pivotal position, wherein when the connector is connected to the locking interface, the connector is configured to rotate around an axis of the pivot shaft, the damper is configured to, upon the connector rotating relatively to the base, enable the connector to return to the initial pivotal position, the connector is connected to the pivot shaft via a hanging member, and the damper comprises a spring, a first end of the spring is connected to the hanging member, and a second end of the spring is connected to a connecting point of a plurality of connecting points of the base.

9. The child safety seat according to claim 8, wherein the hanging member comprises:

a first hanging lug, a first end of the first hanging lug being connected to the corresponding pivot shaft; and a first beam connected to a second end of the first hanging lug, and an extending direction of the first beam being parallel to an axis of the pivot shaft, wherein the connector is mounted on the first beam.

10. The child safety seat according claim 9, wherein the first end of the spring is connected to the first hanging lug of the corresponding hanging member, or the first end of the spring is connected to the first beam.

11. The child safety seat according to claim 8, wherein the connector comprises a first connector and a second connector, the pivot shaft comprises a first pivot shaft and a second pivot shaft, the first connector and the second connector are connected to the first pivot shaft and the second pivot shaft respectively via the same hanging member, the same hanging member comprises:

a second beam, an extending direction of the second beam being parallel to the axes of the first pivot shaft and the second pivot shaft, and the first connector and the second connector being mounted to the second beam, respectively; and a second hanging lug and a third hanging lug, first ends of the second hanging lug and the third hanging lug being connected to the first pivot shaft and the second pivot shaft, respectively, and second ends of the second hanging lug and the third hanging lug being connected to the second beam, respectively.

12. The child safety seat according to claim 11, wherein the first connector and the second connector are mounted at ends of the second beam, respectively, the first connector, the second hanging lug, the third hanging lug, and the second connector are spaced apart from each other on the second beam.

13. The child safety seat according to claim 11, wherein the spring comprises a first spring and a second spring, first ends of the first spring and the second spring are connected to the second hanging lug and the third hanging lug, respectively.

14. The child safety seat according to claim 11, wherein a first end of the spring is connected to the second beam.

15. The child safety seat according to claim 11, wherein the base is provided with a first adjustment hole slidably cooperated with the first pivot shaft, and a second adjustment hole slidably cooperated with the second pivot shaft; the base comprising:
- a first connecting member, a first end of the first connecting member being connected to the first pivot shaft, and a second end of first connecting member being connected to a first sliding rod;
- a second connecting member, a first end of the second connecting member being connected to the second pivot shaft, and a second end of the second connecting member being connected to the second sliding rod, wherein extending directions of the first adjustment hole and the second adjustment hole are parallel to axial sliding directions of the first sliding rod and the second sliding rod, respectively; and
- a locking mechanism configured to lock axial sliding positions of the first sliding rod and the second sliding rod.

16. The child safety seat according to claim 15, wherein the plurality of connecting points is provided on the first connecting member and the second connecting member.

17. The child safety seat according to claim 15, wherein the first connecting member and the second connecting member are connected via a transverse connecting beam, and one of the connecting points is provided on the transverse connecting beam.

* * * * *